C. F. BALL.
TRACK LINK FOR CHAIN TRACKS.
APPLICATION FILED NOV. 7, 1918.
1,344,373.
Patented June 22, 1920.
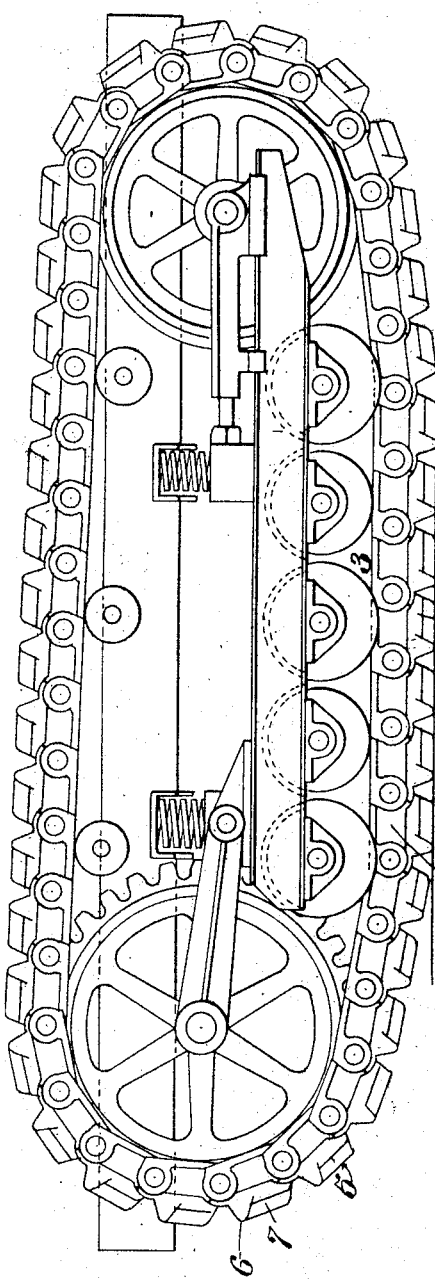
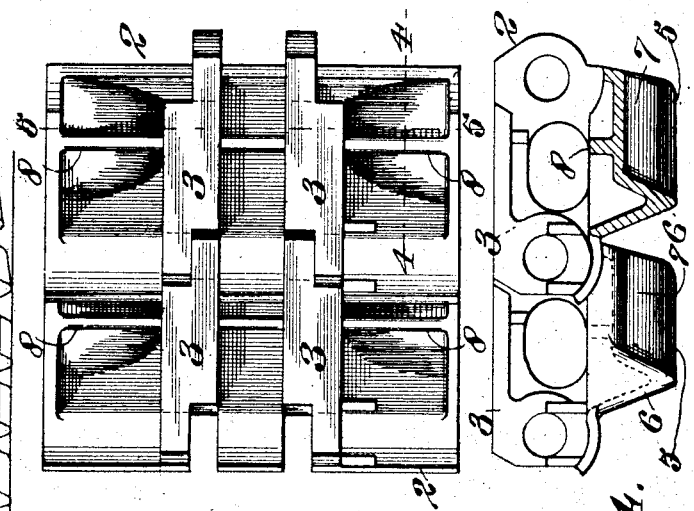
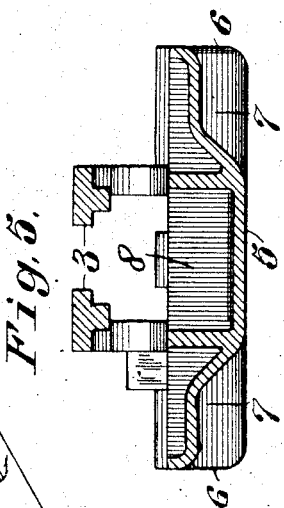
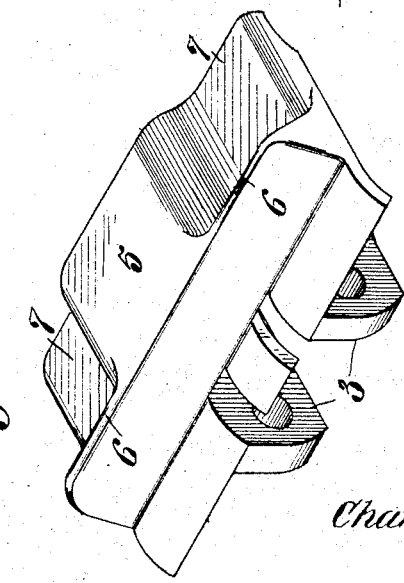
INVENTOR
Charles F. Ball
BY
Strong & Townsend
ATTORNEYS

UNITED STATES PATENT OFFICE.

CHARLES F. BALL, OF PEORIA, ILLINOIS, ASSIGNOR TO THE HOLT MANUFACTURING COMPANY, OF STOCKTON, CALIFORNIA, A CORPORATION OF CALIFORNIA.

TRACK-LINK FOR CHAIN TRACKS.

1,344,373.

Specification of Letters Patent. Patented June 22, 1920.

Application filed November 7, 1918. Serial No. 261,466.

*To all whom it may concern:*

Be it known that I, CHARLES F. BALL, a citizen of the United States, residing at Peoria, in the county of Peoria and State of Illinois, have invented new and useful Improvements in Track-Links for Chain Tracks, of which the following is a specification.

This invention relates to endless, self-laying tracks for use on chain track tractors and other vehicles with chain tracks.

The special object of the invention is to provide a track link, of such design and construction that it insures the proper traction under all working conditions, whether the machine is traveling over a surfaced highway or over soft or rough ground.

In order to get proper traction, it is common to equip chain tracks with outwardly projecting ribs or grousers, but in many jurisdictions and localities it is not permissible to drive a tractor over a finished highway, street, or road so shod with cleats or grousers, because of the injury caused to the highway.

In a co-pending case, Ser. No. 235,644, filed May 20th, 1918, by P. E. Holt there has been described a track link and grouser, in which the grouser is detachable to allow the machine or vehicle to be operated with or without grousers as conditions may require; *i. e.*, when the machine is to be run on finished highways the grousers are detached; and are replaceable when working in the open fields or where additional traction is necessary.

In the present instance I have designed an all-around track link capable of operating over smooth asphalt streets without injury to the street, and which at the same time may be used on muddy roads or over soft ground, all without any change in the track link or track.

Generally, my improved track link may be said to comprise primary and secondary tread surfaces with countersunk grousers so coacting and arranged that the primary tread surfaces will take the load on smooth, hard going without injury to the roadway; the countersunk grousers and the secondary tread surfaces coming only into play when the nature of the ground is such as allows them to become effective.

Having reference to the accompanying drawings:

Figure 1 shows a side elevation of a tractor truck mechanism provided with an endless chain track formed of links made in accordance with the present invention.

Fig. 2 shows a perspective view of one of the links.

Fig. 3 shows a plan view of two connected links.

Fig. 4 shows a side elevation partly in section of the links of Fig. 3, the sectional portion being taken on the line 4—4 of Fig. 3.

Fig. 5 shows a transverse sectional view through one of said links.

A is a chain track composed of conjoined links, each link consisting of a tread plate 2 with upstanding rail sections 3, having rail heads on which the truck rollers are adapted to run. As here shown, the tread plates and rail sections are cast integral.

The tread plates are of suitable length and breadth, usually extending a substantial distance to each side of the pair of rail sections 3, and are practically coincident in length with the length of the sections 3. For high speed work the links are relatively short with relation to their transverse dimensions, so as to facilitate articulation under operating conditions.

The invention here resides, primarily, in the shape and construction of each individual link. As here shown, and viewing the link from its underside, the tread plate presents a substantially flat surface 5 of limited area with laterally extended ribs 6; the outer or contact edges of the ribs and the surface of the area 5 lying in substantially the same plane, so that when the machine is resting on the flat areas 5, the rib extensions 6 may have no harmful effect on the roadway, and yet when the machine is operating on muddy roads or over soft ground these lateral corrugations, provided at the outer edges of the track, will become effective and act as grousers to provide the necessary traction. It is obvious that the shape and area of the tread sections 5 may vary more or less depending on the superposed load.

These said areas 5, which, for convenience, may be termed the flat primary tread areas, are disposed centrally and underlie the track members 3 throughout a considerable portion of the length of the latter and extend a short distance to each side of the track members. Beyond that the tread plates are dished out to form depressions 7, which may be termed the secondary tread areas as they only come into play to support the load when the machine is in soft ground. Of course in good going on hard roads or finished highways the primary tread areas 5 need only be of sufficient dimensions so that they will not injure the road surface, since the highway itself will hold up the load. In soft going, on the other hand, the load must be distributed over a large area and supported on the tracks and it is at that time that the full effective area of the link, including the secondary tread portions 7 come into full play and bear their part of the load.

The laterally extending countersunk grousers, due to the construction shown, not only give traction but act as reinforcing ribs for the link itself. The link may be further reinforced at the side by a transversely extending rib 8, on the inside of the link.

It is obvious that various changes may be made in the details of construction and in the form and proportion of the parts without departing from the spirit of the invention as above expressed.

Having thus described my invention, what I claim and desire to secure by Letters Patent is—

1. A chain track comprising articulated links having successive flat tread portions which alone come in contact with the ground when traveling over hard, smooth surfaces, which links are provided with secondary tread surfaces, and outstanding ribs which come into operation only when working in soft ground and coöperate with the said primary surfaces.

2. A track link for chain tracks having a tread member with upstanding rail sections, and a tread member having a flat primary tread portion arranged substantially centrally of the tread member and beneath the rail sections, said tread member having lateral ribs or grousers, the outer contact edges of which are in substantially the same plane as the bearing surface of said tread member.

In testimony whereof I have hereunto set my hand in the presence of two subscribing witnesses.

CHARLES F. BALL.

Witnesses:
MARIETTA ROCHE,
W. J. LAWLER.